Jan. 31, 1928.
N. M. GINGOLD
VEHICLE TREAD
Filed Feb. 8, 1927
1,657,534
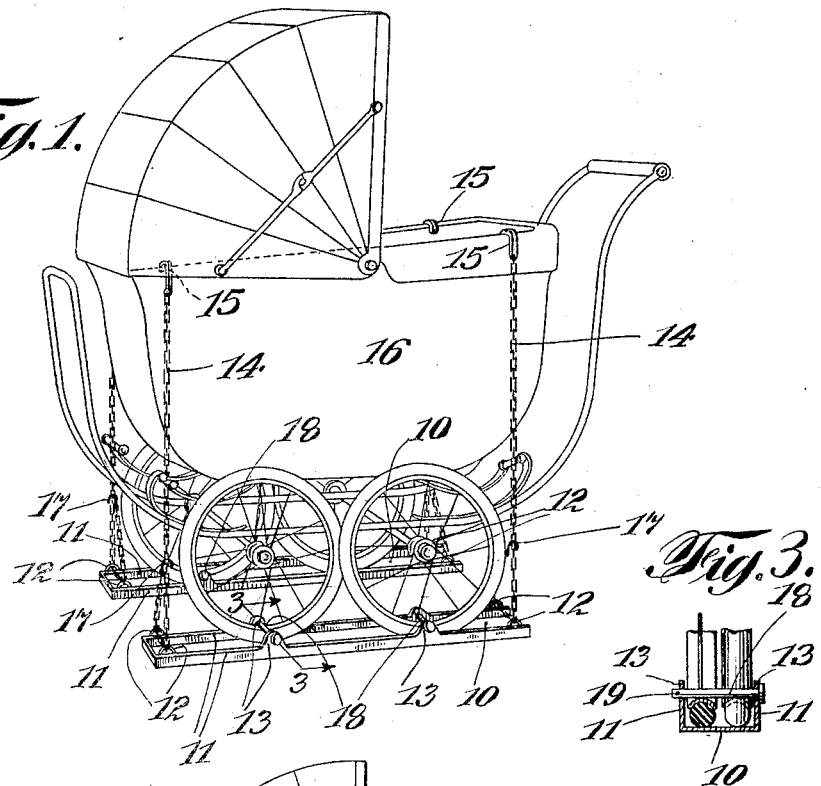
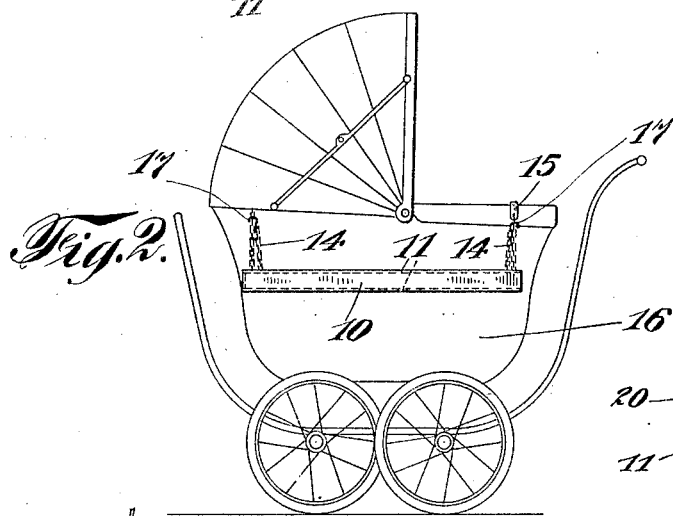
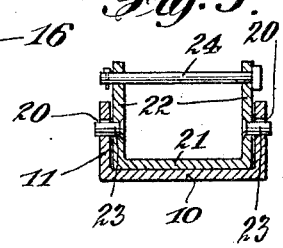
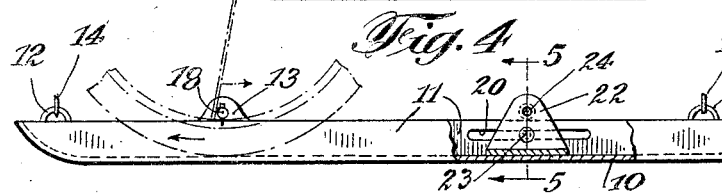

Patented Jan. 31, 1928.

1,657,534

UNITED STATES PATENT OFFICE.

NELLIE MAYER GINGOLD, OF BROOKLYN, NEW YORK.

VEHICLE TREAD.

Application filed February 8, 1927. Serial No. 166,799.

My invention relates to vehicle treads and refers particularly to treads readily placed beneath, and removed from, the wheels of a vehicle.

It is difficult to push or propel, a wheeled vehicle over the ground, or pavement, covered with snow or ice, as the wheels have little or no grip upon the surface and it is equally difficult to propel a sled-like vehicle over a surface not so covered.

It is evident, therefore, that considerable difficulty is experienced in propelling a vehicle when a portion of the surface is ice-covered and a portion uncovered.

The device of my invention, overcomes the above-mentioned and other difficulties incident to vehicle propulsion and presents a means whereby a wheeled device may be readily and quickly converted from a wheeled vehicle to a sled vehicle and reversed with equal ease.

By means of my device, a baby carriage for instance, although my device may be applied with equal effectiveness to other wheeled vehicles, may be used as a wheeled vehicle over an ordinary surface and converted within an extremely short time into a sled vehicle for passage over snow or ice.

My device, therefore, enables a vehicle to be propelled easily and safely over a surface irrespective of whether or not it is covered with snow or ice.

In the accompanying drawings illustrating one form of the device of my invention, similar parts are designated by similar numerals.

Figure 1 is a perspective view of a baby carriage with my device in sled position.

Figure 2 is a diagrammatic view of Figure 1 with my device in raised position.

Figure 3 is a cross-section through the line 3—3 of Figure 1.

Figure 4 is a side view of a modified form of sled runner.

Figure 5 is a cross-section through the line 5—5 of Figure 4.

The particular form of the device of my invention shown in Figures 1, 2 and 3 comprises a channel-shaped tread having the bottom 10 and the two up-turned flanges 11, 11, each flange 11 having a plurality of upwardly extended lugs, or wheel fastening means, 12, 12, opposite similar lugs upon the other flange 2, and a plurality of lugs 13, 13. Each chain 14 has a hook 15 at one extremity capable of placement over a vehicle side 16, and a hook 17 at the other extremity capable of insertion within the links of the chain 14. A pin 18 is capable of insertion through aligned openings within the lugs 13, 13, and has a pin 19 for retention purposes.

The operation of the device is as follows:—

When it is not desired to employ the device, the hooks 15, 15 are placed over the side edge of the carriage and the hooks 17, 17, are inserted in links of the chain 14, the bottom 10 of the device being faced outwardly in order that the tread will extend outwardly as little as possible.

When it is desired to employ the device, the hooks 17, 17 are released from the chain links and the tread lowered and the wheels of the vehicle placed therein. The hooks 17, 17 are then placed in the proper chain links to maintain the tread in position and the pins 18, 18 passed through the openings in the lugs 13, 13 and the wheel, thus preventing continued rotation of the wheel and allowing the vehicle to be moved upon the treads as sled runners.

It will thus be seen that the vehicle may be readily converted from a wheeled vehicle into a sled vehicle.

The modified form of a sled runner shown in Figures 4 and 5 comprises the bottom 10 and the two up-turned sides 11, 11. The sides 11, 11 have aligned slots 20, 20. Positioned within the runner and slidably movable therein is a wheel fastening means, or lug, having the bottom 21 and the two upturned sides 22. Stud pins 23, 23 pass through the sides 22, 22 and the slots 20, 20. A removable pin 24 is capable of placement through openings within the sides 22, 22.

The movable lug is arranged to accommodate the device to vehicles of varying wheel bases.

The operation of this modified form is the same as that described above, the lug being positioned by sliding the pins 23, 23 along the slots 20, 20 until placed in proper position to lock an inserted wheel from revolution.

While the modified form is shown with one movable lug it is evident that both lugs may be made movable.

I do not limit myself to the particular size, shape, number or arrangement of parts as shown and described, as these are given simply as a means for clearly describing my invention.

What I claim is:

In a vehicle tread, in combination, a tread having a bottom member, upwardly extended sides to the bottom member, capable of receiving two wheels, upwardly extended lugs movable longitudinally of and carried by the side members, means for fixedly placing the lug in a predetermined position with respect to each other, a pin capable of passing through aligned openings within the extended lugs preventing the continued revolution of a wheel within the tread, a plurality of chains capable of insertion within the chain links and a hook at the other end of each chain capable of hanging attachment over a side of the vehicle, allowing the device to be raised to and maintained in suspended position without removal of the hooks from the vehicle side.

Signed at New York city, in the county of New York and State of New York, this 29th day of January, 1927.

NELLIE MAYER GINGOLD.